(12) United States Patent
Uriarte et al.

(10) Patent No.: US 12,418,181 B2
(45) Date of Patent: Sep. 16, 2025

(54) MICROGRID CONTROL DESIGN SYSTEM

(71) Applicant: OPERATION TECHNOLOGY, INC., Irvine, CA (US)

(72) Inventors: Fabian Marcel Uriarte, Irvine, CA (US); Mohammad Reza Dadash Zadeh, Irvine, CA (US)

(73) Assignee: OPERATION TECHNOLOGY, INC., Irvine, CA (US)

( * ) Notice: Subject to any disclaimer, the term of this patent is extended or adjusted under 35 U.S.C. 154(b) by 619 days.

(21) Appl. No.: 17/493,444

(22) Filed: Oct. 4, 2021

(65) Prior Publication Data

US 2022/0140611 A1 May 5, 2022

Related U.S. Application Data

(63) Continuation of application No. PCT/US2020/026784, filed on Apr. 5, 2020.

(60) Provisional application No. 62/830,236, filed on Apr. 5, 2019.

(51) Int. Cl.
*H02J 3/38* (2006.01)
*H02J 13/00* (2006.01)

(52) U.S. Cl.
CPC ........ *H02J 3/381* (2013.01); *H02J 13/00006* (2020.01); *H02J 2203/20* (2020.01)

(58) Field of Classification Search
CPC ............ G05B 19/0428; H02J 13/00001; H02J 13/00002; H02J 2310/10; H02J 3/00; Y02E 40/70; Y02E 60/00; Y04S 10/12; Y04S 40/12; Y04S 40/20; G06Q 50/06
See application file for complete search history.

(56) References Cited

U.S. PATENT DOCUMENTS

| | | | |
|---|---|---|---|
| 8,164,217 B1* | 4/2012 | Miller | H02J 7/00 307/64 |
| 2011/0082596 A1 | 4/2011 | Meagher et al. | |
| 2012/0283887 A1* | 11/2012 | Goldsmith | G06Q 50/06 700/286 |
| 2016/0147244 A1* | 5/2016 | Momoh | G05F 1/66 700/297 |
| 2016/0254666 A1* | 9/2016 | Curtiss | H02J 3/0073 700/292 |

(Continued)

FOREIGN PATENT DOCUMENTS

CN 106647712 A * 5/2017
WO WO 2020/181008 A1 3/2020

OTHER PUBLICATIONS

WO, PCT/US20/26784 ISR and Written Opinion, Aug. 24, 2020.
(Continued)

*Primary Examiner* — Mohammad Ali
*Assistant Examiner* — Dhruvkumar Patel
(74) *Attorney, Agent, or Firm* — ONE LLP (57) ABSTRACT

Provided herein are embodiments of systems, devices, and methods for a multi-mode, cross-platform design environment to deploy and monitor microgrid controllers rapidly, safely, and inexpensively. A multi-mode environment may run offline, real-time, and live. A cross-platform environment may run on different operating systems and environments. A design system may allow users (e.g., engineers, managers) to design, test, deploy, tune, and monitor microgrid controllers before and after deployment.

20 Claims, 5 Drawing Sheets

(56) References Cited

U.S. PATENT DOCUMENTS

2017/0046458 A1* 2/2017 Meagher ................ G06F 30/20

OTHER PUBLICATIONS

Transmission and Distribution Committee of the IEEE Power and Energy Society, IEEE Standard for the Specification of Microgrid Controllers, Apr. 23, 2018, The Institute of Electrical and Electronics Engineers Inc., New York, NY.

* cited by examiner

MICROGRID CONTROL DESIGN SYSTEM

CROSS-REFERENCE TO RELATED APPLICATIONS

This application is a continuation of International Patent Application No. PCT/US20/26784, filed Apr. 5, 2020, which claims priority pursuant to U.S.C § 119(e) to U.S. Provisional Patent Application No. 62/830,236, filed Apr. 5, 2019, the disclosures of both of which are hereby incorporated by reference in their entireties for all purposes.

FIELD

The subject matter described herein relates generally to systems, devices, and methods for designing control logic for microgrid controllers. Furthermore, the systems, devices, and methods are multi-mode (e.g., offline, real-time, and live environments) and cross-platform (e.g., run on different operating systems and environments).

BACKGROUND

Microgrids are electrically and geographically small electric power systems capable of operating connected-to or islanded-from a (larger) host grid. "Electrically small" refers to the levels of installed generation capacity (typically less than 50 MW) and nominal voltage (medium and low). "Geographically small" refers to the spatial dimensions of a microgrid, which typically range from personal spaces to campus or residential communities. The IEEE Standards define a microgrid as "a group of interconnected loads and distributed energy resources (DER) with clearly defined electrical boundaries that acts as a single controllable entity with respect to the grid and can connect and disconnect from the grid to enable operation in both grid-connected or island modes." *IEEE Std* 2030.7-2017, *IEEE Standard for the Specification of Microgrid Controllers, IEEE Power and Energy Society*.

Microgrids require control systems to perform vital functions. The IEEE Standards defines microgrid control as "the control functions that define the microgrid as a system that can manage itself, operate autonomously or grid connected, and connect to and disconnect from the main distribution grid for the exchange of power and the supply of ancillary service; it includes the functions of the energy management system; it is the microgrid controller if implemented in the form of a centralized system . . . . A microgrid control system consists of software, hardware, or a combination of both, and can be physically implemented in a variety of ways, including centralized or distributed." Id. The control system may comprise one or many controllers. Controllers that serve local assets are referred to as primary controllers. Local assets can be generators, inverters, energy-storage devices, loads, transformers, etc., that are in proximity to the controller (as opposed to being remotely controlled). Such assets can cost $0.50/watt (e.g., a 25 kW transformer can cost $12,500), so their well-being is very important to their owners. Controllers that dispatch set points to other controllers are referred to as secondary controllers. Set points are reference values. For example, if a controller commands a set point is 1.345, then the asset is looking to obey or perform at or around that value. Tertiary controllers perform the highest-level of control functions such as ancillary services, islanding, and meeting net-flow utility agreements.

Microgrids can be controlled with different control schemes. The schemes typically vary by microgrid size and function.

The most flexible trait of microgrids is the islanding capability. This capability allows microgrids to separate from their host grids and convert to islanded "micro" power systems. This trait, however, is also inflexible in that it requires microgrids to be energy-independent and support their loads for an intended period of time—e.g., from hours to months depending on the microgrid type. Although microgrids can be as small as one generator and load, today they take the form of industrial facilities such as data centers, office buildings, hospitals, submarines, ships, university campuses, military installations, etc.

Microgrids are considered intelligent when their operation is autonomous and computer controlled. This allows microgrids to adapt to changing conditions but requires well-designed control, sensors, and automation. Intelligent microgrids should not only should and isolate performance issues but should also reroute power from alternate sources to maintain service continuity.

Thus, needs exist for systems, devices, and methods to design, test, deploy, tune, and monitor microgrid controllers rapidly, safely, and inexpensively, which further provide the ability for engineers to design arbitrary control logic to best suit their microgrid performance requirements.

SUMMARY

Provided herein are example embodiments of systems, devices and methods for a multi-mode, cross-platform design environment to deploy and monitor microgrid controllers rapidly, safely, and inexpensively. A multi-mode environment may run offline, real-time, and live. A cross-platform environment may run on different operating systems and environments (e.g., Windows, Linux, etc.). In some embodiments, the design environment may include specialized software tools and dedicated hardware which all are referred to as a design system or a design suite. The design system may allow users (e.g., engineers, managers) to design, test, deploy, tune, and monitor microgrid controllers before and after deployment.

The term microgrid controller is defined herein as an autonomous, stand-alone unit of computing hardware. In many embodiments, the microgrid controller may be a single unit. In some embodiments, the microgrid controller may include additional external hardware. The hardware control logic to ensure a microgrid meets its performance objectives. The objectives may include, but are not limited to, ensuring stability, reserve margins, and quality-of-service during normal and abnormal conditions. As used herein, control logic may refer to callable computer programs or files, that can be or can include logic or data specified by users.

In some embodiments, the present disclosure may include a system for creating control logic to control a microgrid, comprising: a host machine comprising a control system designer for generating the control logic, a microgrid simulator, a monitoring system, and a plurality of analysis services; a microgrid controller, connected to the host machine, comprising a data server; and wherein the control logic is deployed to the microgrid for controlling the microgrid.

Other features and advantages of the present invention are or will become apparent to one skilled in the art upon examination of the following figures and detailed description, which illustrate, by way of examples, the principles of the present invention.

The systems, methods, and apparatuses for designing control logic for use in microgrid control design system described herein in detail are only example embodiments and should not be considered limiting. Other configurations, methods, features and advantages of the subject matter described herein will be or will become apparent to one with skill in the art upon examination of the following figures and detailed description. It is intended that all such additional configurations, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Generally, the present disclosure provides a holistic design system of hardware and software tools. The tools provide an easy-to-use design experience that may enable users (e.g., engineers) to design, test, tune, deploy, and monitor microgrid controllers while hiding low-level mathematical, configuration, and communication details. The code that runs in the microgrid controller may be testable in advance of deployment, and therefore yields highly confident designs. After deployment, the controllers may interact with live microgrids via their communication systems and can be fined-tuned and their logic hot-swapped on demand.

In some embodiments, the design system may allow users to create logic to control simulated (offline and/or real-time) or live microgrids with high levels of confidence. The design system may also allow users, e.g., engineers, to create microgrid control systems while hiding low-level mathematical, communication, and configuration details. The design system may include an offline microgrid simulator that allows creating virtual microgrid testbeds to test the controllers before deployment. An example of an offline simulator is disclosed in PCT application number PCT/US20/21032, filed Mar. 4, 2020, which is incorporated herein in its entirety. The simulator may model and analyze power system, especially AC, DC and hybrid AC and DC microgrids. The model may represent a microgrid controller that interacts with microgrid assets within the simulation environment while it is a true replica of the actual microgrid controller that will be used in real microgrid system. Supported analysis types may be any of the basic studies such as time-domain load flow, short circuit, dynamic and electromagnetic transient studies as well as advanced studies, such as economic dispatch, protection, and coordination. The analysis tools may further simulate programmable microgrid controller behavior through a model embed in an element containing several user interfaces. In some embodiments, the interfaces may include (1) a user interface where microgrid assets associated with the microgrid controller may be defined, (2) a user interface where a user may define outgoing data to other controllers, (3) a user interface where the user may assign programmed functions or logic, and (4) a user interface that shows the controller settings. In some embodiments, the system may include basic and advanced power system analysis tools such as time-domain load flow, short circuit and transient stability studies for a given microgrid. These tools may allow a user to evaluate the performance of the programmed controller logic. In some embodiments, once satisfied with the controller model performance, the control logic, stored setting file and all communication settings to read/write date from/to microgrid assets that are set-up by a user for monitoring purpose and controlling data points may be transferred to the controller hardware. In addition, a microgrid controller can utilize software tool capabilities during operation in the field to perform basic and advanced power system analyses and utilize their results as part of the control logic. In this scenario, the software tool may employ real-time data to tune or verify the power system model under control to simulate real-time situation. All microgrid controller inputs and outputs may be recorded in a file during performance evaluation for further testing and debugging. Further details are disclosed in PCT application number PCT/US20/21032.

In some embodiments, the design system may include two approaches to design microgrid controllers: graphical and programmatic. The graphical approach is user-friendly and include available library blocks. The programmatic approach is not as user-friendly but may be more flexible and extensible. Controller designs completed with either approach can be deployed to the stand-alone controller hardware. These controllers may eventually be relocated near or with the microgrids they control.

In some embodiments, the physical realization of a microgrid controller may be a dedicated, stand-alone, lightweight, portable, low-profile, and rugged hardware enclosure. In some embodiments, the controller may include, but not limited to, one or more types of communication ports, of network cards, specialized form factor, and enhanced heat management (e.g., twin-fans or notable heat sink). The enclosure may contain a computing device which includes one or more processors and non-transitory computer readable memory storing instructions that when executed cause the processors to continually run a computer program. In some embodiments, the computer program may invoke, for example via a function call or application programming interface (API), the user-defined controller assembly as inbound data arrives. In some embodiments, the assembly may be a .dll file, or other suitable files. The control logic may be executed deterministically and/or periodically when measurements arrive. This input data may be the monitored online field data declared by users during the controller design. The data may include measurements such as generator outputs, bus voltages or observable quantities of interest such as interconnection tie-line flows and circuit breaker status.

In some embodiments, when the user-defined control logic runs inside the microgrid controller, it may become responsible for executing the control functions defined by the user. Typically, but not necessarily, these functions may include the dispatch function and the islanding function. Other functions may include load-shedding or frequency regulation functions. The dispatch function may calculate and dispatch set points to primary controllers in real-time. The islanding function may determine when to connect or disconnect from the host grid and then coordinate such action. Both functions may execute as designed by the users of the design system.

Other control functions may include fault mitigation, topology reconfiguration, steady-state deviation corrections, islanding, the autonomous operation of energy storage systems, load-shedding, and generation curtailment, just to name a few. Topology reconfiguration can be used to reduce distribution losses, but also to reduce vulnerability to external attacks. Some control actions may also need occasional software updates or human intervention. For example, outages that cannot be fixed automatically may be repaired by a maintenance crew.

During design-time and run-time, microgrid controllers may share online data with a host machine, for example via a human-machine interface. The interface may provide users (e.g., engineers) with visual tools to monitor system data on the microgrid simulator's one-line diagram. If the monitored data reveals performance deficiencies as a result of improper control actions, the control logic may be tuned and re-deployed instantly without decommissioning the microgrid controller. Re-deployment without decommissioning may be referred to herein as "hot-swapping."

In some embodiments, the design system may also enable users to program on-demand studies as part of the control logic. For example, controllers (before and after deployment) can request electrical analyses from host machines. The results may be returned to the microgrid controller and archived for future lookups. At any time, the controller can use the results to make decisions rapidly. Over time, analyses data may be accumulated and stored locally on the microgrid controller. The microgrid controller data may even be accessible when the host machine is not. For example, the microgrid controller data can be requested from the web if a host machine is not available. In some embodiments, analyses data may be stored in a server and the microgrid controller may access the data remotely.

In some embodiments, the microgrid controller of the present disclosure spans secondary and tertiary capabilities.

Figure 1:
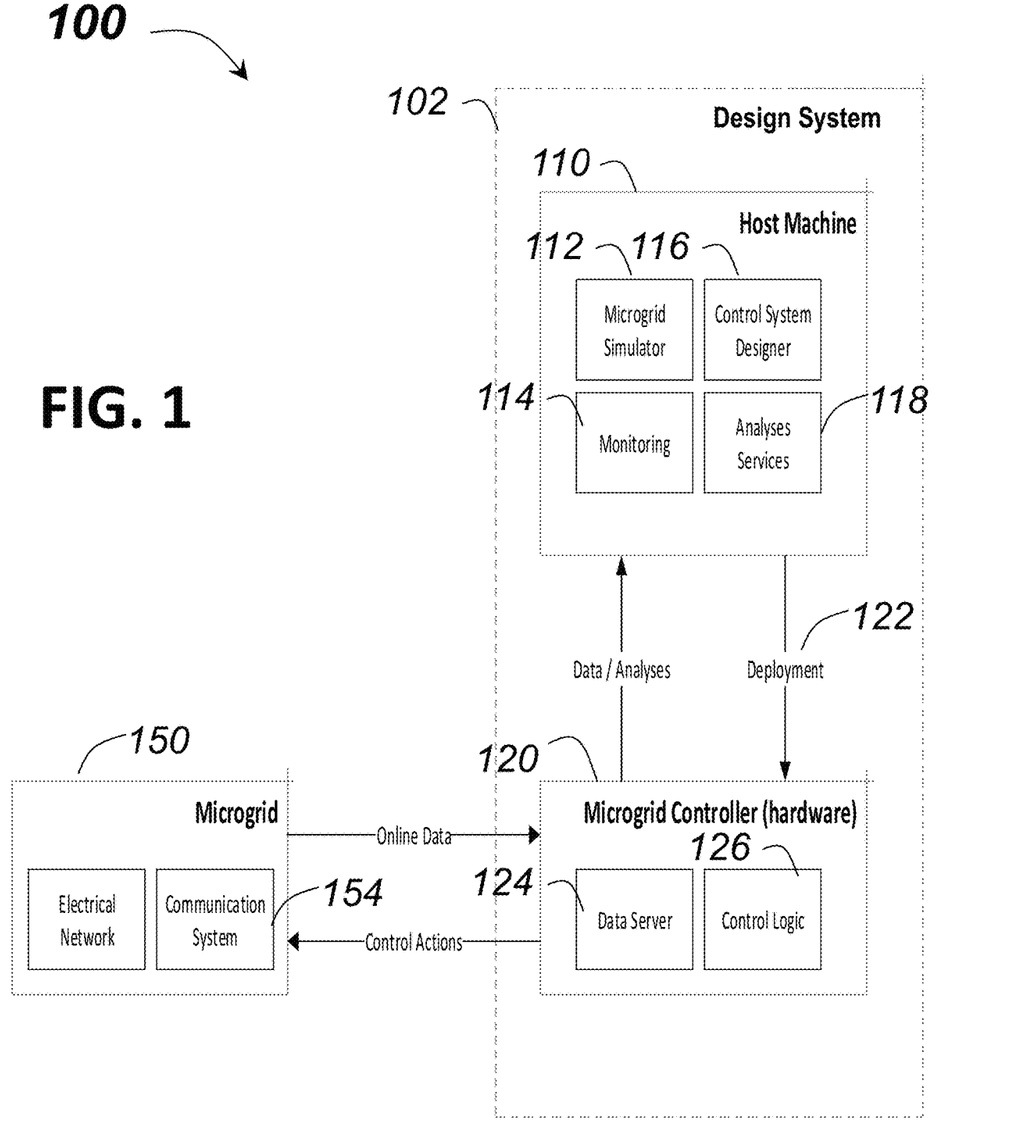
FIG. 1 illustrates an overview of an exemplary microgrid controller design environment, according to some embodiments of the present disclosure.

Turning now to the drawings, FIG. 1 shows an overview of an exemplary microgrid controller design environment 100, according to some embodiments of the present disclosure, that may include a microgrid controller design system 102. The design system 102 may include a host machine 110 and a microgrid controller 120. In some embodiments, the microgrid controller 120 may be a dedicated, stand-alone, lightweight, portable, low-profile, rugged computing device residing inside a rugged enclosure.

Also shown in FIG. 1 is a microgrid 150 (not part of the design system 102) which may include one or more data slaves and may be connected to the controller 120 via a network, e.g., a local network. In most embodiments, microgrid controllers are deployed locally to (or on premise with) microgrids and are not be physically near nor accessible to host machines. During design-time and testing, however, the microgrid controllers are physically next to the user's host machine. Although not in proximity when deployed, the microgrid controller and host machine may still communicate with one another remotely; however, the microgrid controller may not require a host machine for it to function. This architecture detail advantageously makes the microgrid controller testable before deployment.

Host Machine

In some embodiments, the host machine 110 may run a plurality of software tools tiered into a plurality of groups. In some embodiments, there may be four groups: the microgrid simulator 112, monitoring system 114, control system designer 116, and analysis services 118. As an example, an analysis service may be in the form of software that runs studies trigged on-demand. For example, if the controller needs to "think" outside of its capabilities, it may make an outbound call to such service and request analysis or further data. During design-time, the analyses services may be on or accessible through the host machine. When deployed, the same services may be reached remotely over a network connection. Each of these groups is described further below.

In some embodiments, the microgrid simulator 112 may allow users to model, simulate, and visualize electrical networks of arbitrary size (not restricted to microgrids) in advance of deployment. Users can model microgrids using one-line diagrams and run system studies such as transient stability, islanding, year-round load flows, short-circuit, electromagnetic transients, among others. The simulation results may appear directly on the one-line diagrams. After the microgrid controller is deployed, the same one-line diagram may be used to visualize measured data from the field. The field data may be transmitted from the microgrid controller to the host machine.

Figure 3:
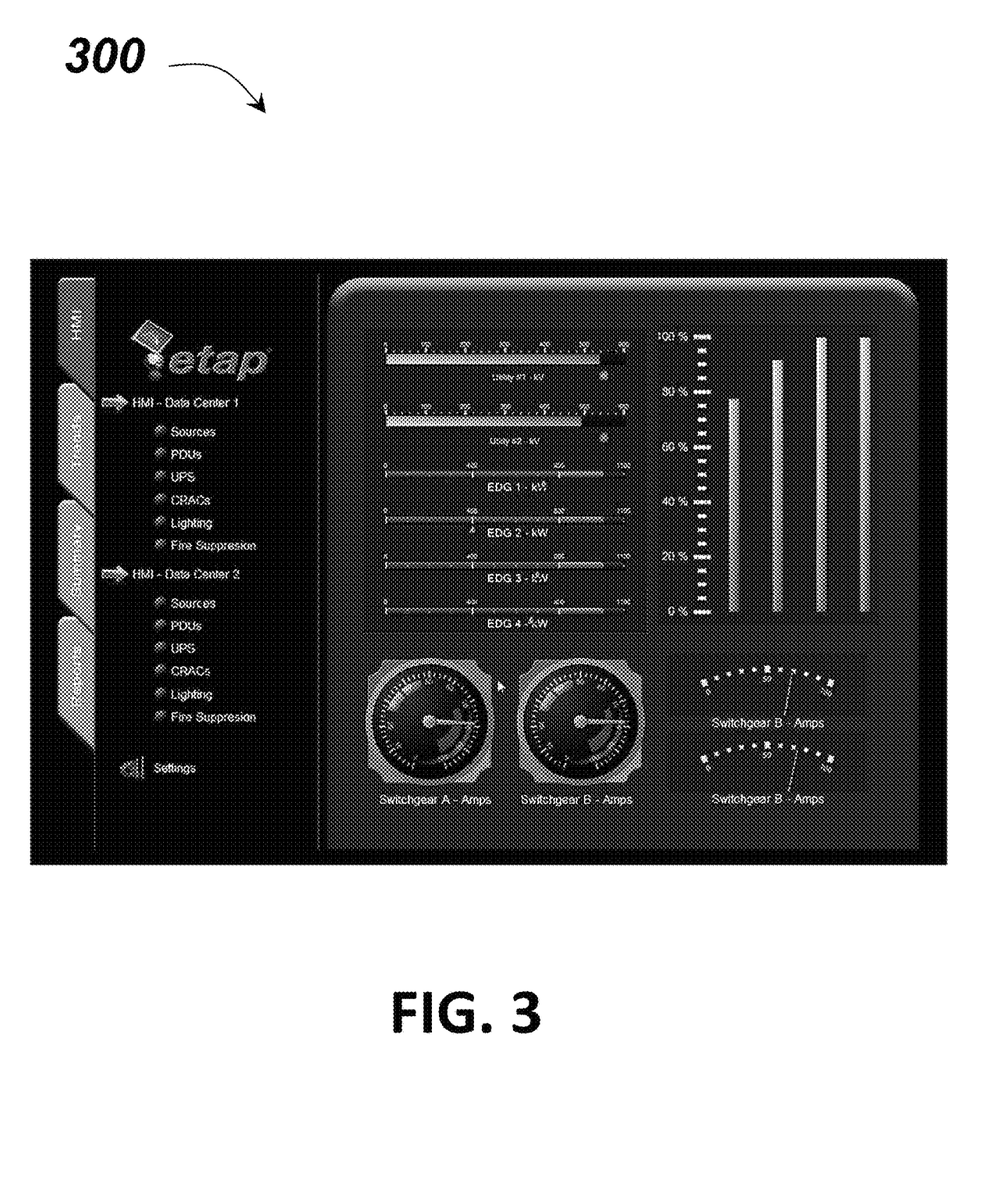
FIG. 3 illustrates an exemplary display, according to some embodiments of the present disclosure.

In some embodiments, the monitoring system 114 may collect measurements from both microgrid and microgrid controllers. The design system 102 may include a data server configured to receive, e.g., via the network, data from the field. Data from the field may include, for example, field measurements such as bus voltages, generator power, load consumption, transformer tap settings, cable current, etc. The data server may archive data which allows the monitoring system to offer advanced visualization tools. These tools may include dashboards, gauges, charts, trends, statistics, databases, and analyses which can be displayed on the host machine or project to large screens in operator rooms, as illustrated in exemplary display 300 of FIG. 3. The monitoring system 114 may be highly configurable. For example, users may design the dashboards and access locally on the host machine or visualize them remotely from the web.

Figure 4:
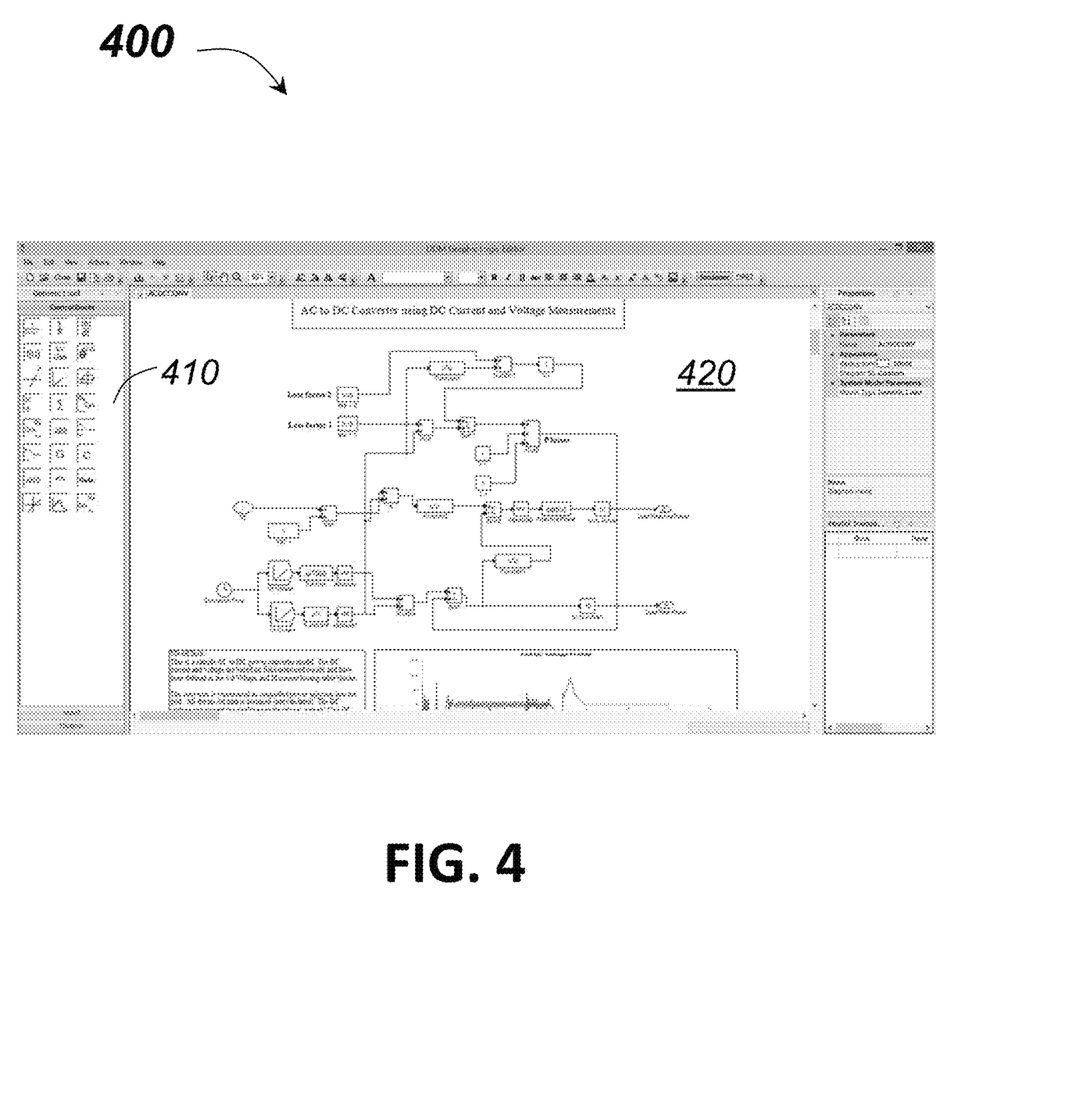
FIG. 4 illustrates an exemplary graphical interface, according to some embodiments of the present disclosure.

In some embodiments, the control system designer 116 may allow users to generate cross-platform control assemblies (e.g., .dll files) which are deployable to microgrid controllers. The designer 116 may offer two approaches to design control systems: graphical and programmatic. The graphical approach offers an intuitive, friendly, and visual approach to designing control systems. FIG. 4 illustrates an exemplary graphical interface 400, according to some embodiments. This environment may feature a library 410 of control blocks that users can interconnect arbitrarily to form control flows. The designer 116 may allow the users to select library blocks and drag them onto a graphical control design surface 420. The designer 116 may then allow the users to interconnect and parameterize the blocks. When finished, the control system design may be compiled into a cross-platform file, e.g., .dll file. This file can run on Windows or Linux (or any suitable operating system) and may contain embedded within it the control logic and all communication configuration as specified by the user. The file (e.g., .dll file) may be a binary file and not human-readable. The file can be tested offline with the microgrid simulator 112 or it can be deployed to a microgrid controller for use with a live microgrid.

The programmatic approach may allow users to write control logic as scripts. This approach may offer added freedom to express control flows as code and may not restrict users to available library blocks. Both the graphical and programmatic approaches complement each other in terms of user-experience. Both approaches result in a compiled controller assembly file (e.g., .dll file) which can be deployed to microgrid controllers. The microgrid controller may be agnostic to either approach.

The deployment link 122 represents data transferred from the host machine 110 to the microgrid controller 120. The communication, format, and content of the transfer may be hidden from users. In some embodiments, users may not have to be concerned with the details of this capability—rather they may only need to specify the address (e.g., computer address such as IP address and port number) of the microgrid controller 120 they are targeting. The deployment feature of the design system copies the controller assembly from the host machine 110 to the target microgrid controller 120.

Microgrid Controller

In some embodiments, the microgrid controller 120 may deterministically execute at least two computer programs: a data server 124 and the user control logic (e.g., .dll file) 126. The data server 124 may scan the microgrid's communication system 154 on a regular basis to bring-in measurement data. The data emanates from each accessible microgrid communication device. In some embodiments, a communication device may be, or may include a data slave, which may collect data from remote-terminal units and concentrate the data into an accessible location. This device is referred to as a slave because it serves out data to masters (remote hardware) that request the data. In some embodiments, a communication device may be or may include a headless (no monitor) stand-alone hardware (or computer board) that concentrates data and serves it out to select callers, e.g., data server 124 (the "master").

In some embodiments, to perform data scans, the system may use tags to specify the microgrid communication system device's information. A tag may include sufficient information to map raw data (e.g., slave data) received to meaningful named measurements. The tags may include computer addresses (e.g., IP address and port of the slave device) and general metadata required by the data server to connect to the communication devices. In some embodiments, tags may be specified using XML. Below is an exemplary XML tag:

<Tag ID="avc8431" Address=56 Name="In|WTG12|Pe"/>

Additionally, there may be address information that dictates how to map raw numbers to named measurements.

When a connection is formed, the data server may retrieve measurements from the microgrid communication devices. At a low-level, data is fetched over the network using communication drivers included with the data server. Users may not need to be concerned about the communication details of fetching the data.

The data may be scanned and communicated back to the microgrid controller, using communication protocols such as DNP3, ModBus, and IEC61850. These protocols may be pre-programmed and configured in the data server. The choice of communication protocol depends on the data's source device. For example, microgrids may have a mix of old and new communication devices that expose data over different communication protocols. The users of the design system may not need to know the details of the communication protocol.

When data arrives at the data server 124, the data may immediately be inspected for changes from past scans. Data that does not change across scans may be discarded. New data may be archived locally and then passed to the controller assembly (e.g., as .dll file) as input. The assembly receives the data, executes user-defined logic, and produces a response which may be transmitted back to the data server 124. This response is referred to as the control action. The data server 124 may log the response and then submit the control action(s) to the microgrid communication devices. In some embodiments, the response payload may contain a control command directed at a particular controllable asset. The microgrid communication system 154 may use the payload details to dispatch the command appropriately.

Microgrid

The microgrid is not part of the suite—rather, it is a live controllable electrical network owned by a third party (e.g., stake holder, utility, facility, etc.). (In test environments, a real-time simulator may be used instead of live networks.) Such electrical network may appear to the microgrid controller as a slave. The controller may not interface directly with a microgrid: it may interface with a communication system comprised of devices communicating two-way data.

In some embodiments, when deployed, microgrid controllers may reside locally to microgrids (i.e., on premise) and may not be physically accessible to host machines. The microgrid communication system exposes measurements to microgrid controllers. The data is communicated over a network (e.g., a local network) using established transport and communication protocols. It is with this input data that microgrid controllers make decisions and return control commands back to the microgrid. The returned control commands use the same communication protocols and reach their intended assets by way of the microgrid communication system devices.

The present disclosure advantageously abstracts all communication details from the users. Instead, users specify which devices they want measurements from, and the data arrives as inputs to the controller assembly during runtime. The devices are specified with human-readable strings called tags. The data server, as described above, converts these strings to device addresses in order to perform data scans. Therefore, the design system advantageously makes collecting field data trivial (e.g., with live measurements travelling over the network from the field to the data server). Users need only specify tags and are not responsible for knowing details of the message formats or transport protocols.

Workflow

Figure 2:
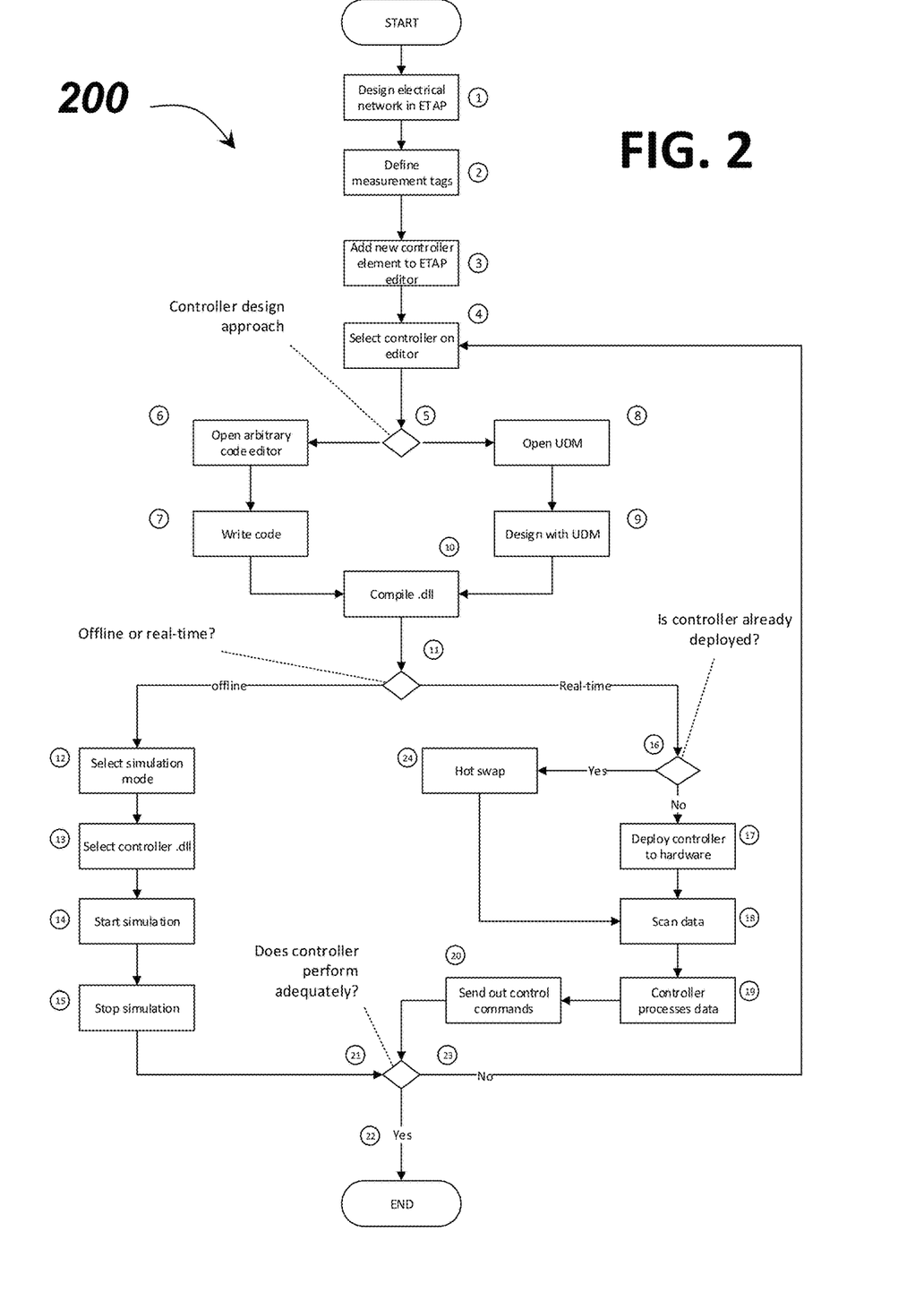
FIG. 2 illustrates an exemplary overview flow diagram of the design system's workflow, according to some embodiments of the present disclosure.

FIG. 2 shows an exemplary overview flow diagram 200 of the design system's workflow. The numbered labels in FIG. 2 correspond to the numbered list of steps below.

1. At this step, the design system may allow a user to design an electrical network. The network can be a microgrid or an arbitrary controllable electrical network. In FIG. 1 this step may be done with the microgrid simulator 112.

2. After the electrical network design is completed, the design system may receive the communication tags defined by the user. The tags may describe the input data to the controller and also which electrical assets are controllable. Selected electrical assets are controlled from control system outputs. The tags may also contain information on where to get the data from (i.e., information on the microgrid communication device hardware). In the example below, slave information atop contains IP address and port number along with other connection information for the slave that emits the tag data. The tags below the slave definition map raw data addresses into meaningful measurement quantities.

```
<Slave Type="Dup3" ID="3270b" IpAddress="10.10.1.246" Port="999" Source="101" Destination="2">
  <AnaIn>
  <Tag ID=In|TieCable|Va_from_mag" TagAddress="0" TagName="Va_from_mag"/>
  <Tag ID=In|TieCable|Va_from_mag" TagAddress="1" TagName="Vb_from_mag"/>
  <Tag ID=In|TieCable|Va_from_mag" TagAddress="2" TagName="Vc_from_mag"/>
  <Tag ID=In|TieCable|Va_from_angle" TagAddress="3" TagName="Va_from_angle"/>
  <Tag ID=In|TieCable|Va_from_angle" TagAddress="4" TagName="Vb_from_angle"/>
  <Tag ID=In|TieCable|Va_from_angle" TagAddress="5" TagName="Vc_from_angle"/>
```

3. After an electrical network is designed and the tag information is known, but before starting a controller design, the design system may allow the user to add a controller element to the microgrid simulator electrical network one-line diagram. The microgrid simulator may offer a library of electrical elements of which one is a controller element.
4. After the controller element is added to the one-line diagram, it may be selected. This selection enables configuring the controller element (e.g., specifying its capabilities and declaring the assets it will communicate with).
5. At this step, the design system may provide users with two approaches to choose to design the controller logic: graphical or programmatic via scripts.
6. If using scripts, at step 6 in FIG. 2 the design system opens a code editor of user's choice.
7. The user then writes control logic code in a language compatible with the controller hardware. The user code complies with an interface that is automatically generated by the microgrid simulator. For example, for the microgrid controller hardware to call the control logic defined by users, the logic may be defined (or written) behind an interface the controller understands. An interface abstracts the control logic away from the microgrid controller that hosts it. During runtime (e.g., when the controller is being tested or when it is deployed), the inputs to the user code are defined by tags and the data collected from the field. (The tags map raw field data into meaningful measurements). The outputs of the user code are also mapped using tags to convert control commands into raw data that is submitted to the communication system.
8. If the user chooses the graphical approach, at step 8 in FIG. 2, the design system launches a control system designer tool (such as 400) as shown inside the host machine in FIG. 4.
9. The control system designer tool may also allow the user to design controllers by wiring-up control-logic blocks from a pre-defined library. Controllers designed as such are termed user-defined models (UDM).
10. At step 10, after the control logic has been designed, the design system may compile the code into a deployable assembly (i.e., .dll file). When using the programmatic approach, a code editor may create such .dll file. When using the graphical approach, when the user selects a button presented to him or her, the control system designer tool 116 creates the .dll from within the design environment.
11. At step 11, the design system may determine the runtime environment by presenting the user with selections. During designing and testing, and before deployment, the user typically works with offline simulations. The microgrid simulator can act as the offline simulator. This makes the design system holistic. There is no need to acquire third-party tools to design and deploy the controller.
12. The design system receives the simulation mode (e.g., transient stability, time-domain load flow, etc.) selection from the user, using offline environment. The simulation mode is included with the microgrid simulator.
13. Before starting the simulation, the design system receives input from the user specifying which .dll to use.
14. At step 14, the simulation starts when the design system receives a start input from the user.
15. The simulation automatically ends after a pre-allocated stop time (e.g., 10 secs).
16. If using real-time environments, the design system may prompt the user on whether the controller is already deployed or not. It is possible that users intend on hot-swapping a design during testing
17. For first-time deployment, the design system may ask the user to provide the computer address of the microgrid controller enclosure.
18. Once deployed, the microgrid controller starts to scan data according to the information provided by the slave data and tags. Scans may occur on a regular interval (e.g., every 1 second).
19. When new data arrives, the data server passes maps the field-collected raw data using tag information. The resulting meaningful measurements are passed to the control logic assembly as input data. The controller processes the new data and emits an output (i.e., control action or command).
20. The data server receives the control actions, maps them back to raw data using tags, then sends them out to the microgrid communication devices. Details of the handshake between the data server and the communication devices are given by the combination of slave and tag data.
21. Either the monitoring tools 114 (see FIG. 1) or the one-line diagram microgrid simulator may provide results indicating whether the electrical behavior is adequate.

22. If the behavior is adequate, the design and deployment is considered complete (end).
23. If the behavior is not adequate, upon receiving input from the user, the design system may go back to step 4 and allow the user to tune the controller. Below is an exemplary XML, code for changing controller settings to fine-tune a response.

```xml
<FunctionName="Operating Limits">
  <Setting Tag="ESScap1" Label="Rated Capacity" Category="Storage 1"
DataType="Numeric" Unit="MWh" Min="0" Max="1000" Step="0.1"
DefaultValue="10" Description="Storage 1 Rated Capacity" Value="4.0" />
  <Setting Tag="SOCmin1" Label="Min SOC" Category="Storage 1"
DataType="Numeric" Unit="%" Min="0" Max="100" Step="0.1" DefaultValue="10"
Description="Storage 1 Minimum SOC" Value="0.0" />
  <Setting Tag="SOCmax1" Label="Max SOC" Category="Storage 1"
DataType="Numeric" Unit="%" Min="0" Max="100" Step="0.1" DefaultValue="90"
Description="Storage 1 Maximum SOC" Value="100.0" />
  <Setting Tag="PChmin1" Label="Min Charge" Category="Storage 1"
DataType="Numeric" Unit="MW" Min="0" Max="1000" Step="0.1" DefaultValue="0"
Description="Storage 1 Minimum Charge" Value="0.0" />
  <Setting Tag="PChmax1" Label="Max Charge" Category="Storage 1"
DataType="Numeric" Unit="MW" Min="0" Max="1000" Step="0.1" DefaultValue="5"
Description="Storage 1 Maximum Charge" Value="2.0" />
  <Setting Tag="PDisChmin1" Label="MinDischarge" Category="Storage 1"
DataType="Numeric" Unit="MW" Min="0" Max="1000" Step="0.1" DefaultValue="0"
Description="Storage 1 Minimum Discharge" Value="0.0" />
  <Setting Tag="PDisChmax1" Label="Max Discharge" Category="Storage 1"
DataType="Numeric" Unit="MW" Min="0" Max="1000" Step="0.1" DefaultValue="5"
Description="Storage 1 Maximum Discharge" Value="2.0" />
  <Setting Tag="QChmin1" Label="Min Reactive Power Absorbtion"
Category="Storage 1" DataType="Numeric" Unit="Mvar" Min="0" Max="1000"
Step="0.1" DefaultValue="0" Description="Storage 1 Minimum Reactive Power
Absorbtion" Value="0.0" />
```

24. When re-deploying a controller, a hot-swap technique may replace the controllers inside the hardware with the new design. This live operation may avoid decommissioning the controllers. Hot-swapping is extremely advantageous because it can be done during testing and even remotely immediately upon new controller adjustments (updates) becoming available.

System Architecture

Figure 5:
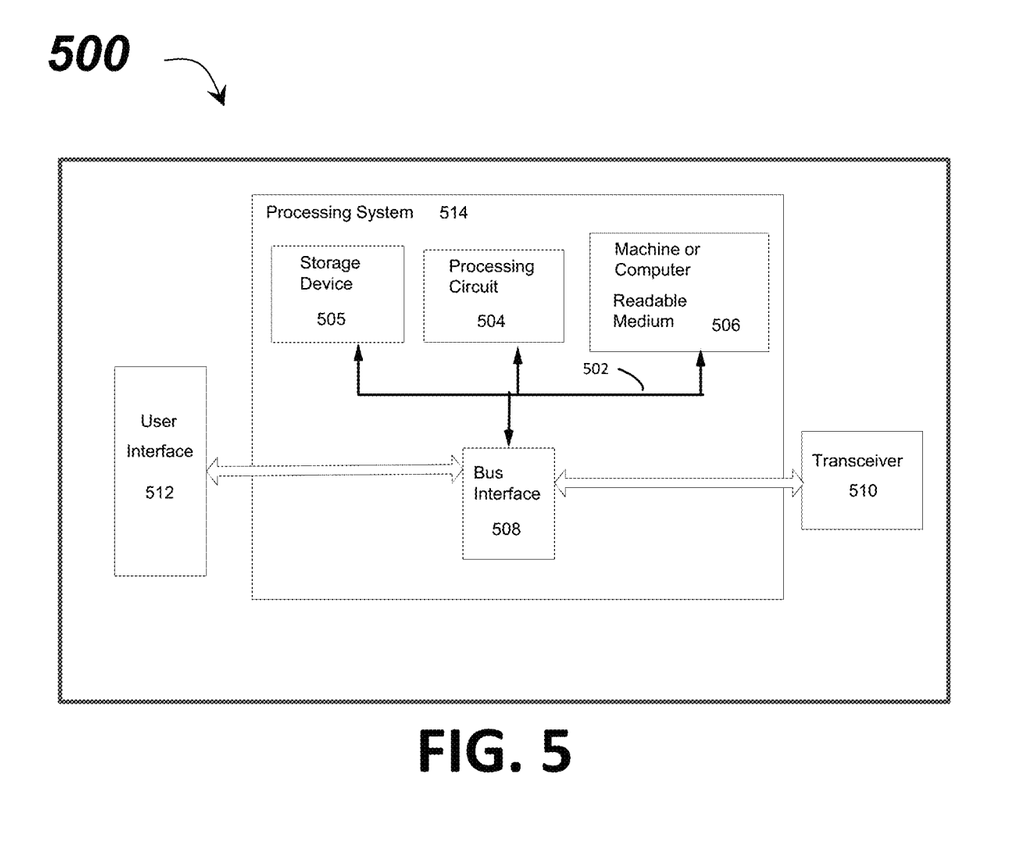
FIG. 5 illustrates an exemplary overall platform in which various embodiments and process steps disclosed herein can be implemented, according to some embodiments of the present disclosure.

FIG. 5 illustrates an exemplary overall platform 500 in which various embodiments and process steps disclosed herein can be implemented. In accordance with various aspects of the disclosure, an element (for example, a host machine or a microgrid controller), or any portion of an element, or any combination of elements may be implemented with a processing system 514 that includes one or more processing circuits 504. Processing circuits 504 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 504 may be used to implement any one or more of the various embodiments, systems, algorithms, and processes described above, for example, process 200 illustrated in FIG. 2. In some embodiments, the processing system 514 may be implemented in a server. The server may be local or remote, for example in a cloud architecture.

In the example of FIG. 5, the processing system 514 may be implemented with a bus architecture, represented generally by the bus 502. The bus 502 may include any number of interconnecting buses and bridges depending on the specific application of the processing system 514 and the overall design constraints. The bus 502 may link various circuits including one or more processing circuits (represented generally by the processing circuit 504), the storage device 505, and a machine-readable, processor-readable, processing circuit-readable or computer-readable media (represented generally by a non-transitory machine-readable medium 506). The bus 502 may also link various other circuits such as timing sources, peripherals, voltage regulators, and power management circuits, which are well known in the art, and therefore, will not be described any further. The bus interface 508 may provide an interface between bus 502 and a transceiver 510. The transceiver 510 may provide a means for communicating with various other apparatus over a transmission medium. Depending upon the nature of the apparatus, a user interface 512 (e.g., keypad, display, speaker, microphone, touchscreen, motion sensor) may also be provided.

The processing circuit 504 may be responsible for managing the bus 502 and for general processing, including the execution of software stored on the machine-readable medium 506. The software, when executed by processing circuit 504, causes processing system 514 to perform the various functions described herein for any apparatus. Machine-readable medium 506 may also be used for storing data that is manipulated by processing circuit 504 when executing software.

One or more processing circuits 504 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

It is to be understood that this disclosure is not limited to the particular embodiments described herein, as such may, of course, vary. It is also to be understood that the terminology used herein is for the purpose of describing particular embodiments only and is not intended to be limiting.

As used herein and in the appended claims, the singular forms "a," "an," and "the" include plural referents unless the context clearly dictates otherwise.

In general, terms such as "coupled to," and "configured for coupling to," and "secure to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Various aspects have been presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

What is claimed is:

1. A system for generating and deploying control logic for the control and operation of an electrical microgrid, the microgrid defined as an electrically and geographically small electrical network capable of operating in an islanded mode, while connected to a utility grid, or during planned or unplanned transitions between such modes, the system comprising:
a host machine comprising:
a control system designer configured to create, tune, and optimize control logic, the control logic comprising callable computer programs or files for execution by microgrid controller hardware, wherein the control system designer is configured to generate the control logic using at least one of: (i) a graphical user interface employing predefined control blocks, or (ii) a script-based programmatic interface, and wherein the control logic is compiled into a deployable, cross-platform software assembly suitable for execution within a microgrid controller,
a microgrid simulator comprising a software-based tool configured to model, simulate, and visualize dynamic behavior of the electrical microgrid under control of the deployed logic,
a monitoring system configured to collect, visualize, and analyze operational data from at least one of: (i) the microgrid simulator, or (ii) a real or emulated target electrical microgrid, including its constituent controllers, and
a plurality of analysis, modeling, and configuration services configured to support iterative development, validation, and refinement of the control logic;
a microgrid controller, temporarily communicatively coupled to the host machine over a network, the microgrid controller comprising at least a data server and a central runtime environment for executing the deployed control logic; and
wherein the control logic, once deployed to the microgrid controller, is operable to monitor, command, and control, in a closed-loop configuration, a target electrical microgrid selected from one of: (i) a simulated microgrid via the simulator, (ii) a third-party real-time simulation, (iii) a power-hardware-in-the-loop emulation environment, or (iv) a physically deployed microgrid;
wherein the control logic utilizes telemetry and field data to inform and enact control decisions in real time, including at least one of: fault mitigation, dispatch, steady-state deviation correction, generation curtailment, load management, planned islanding, or unplanned islanding;
wherein the microgrid controller is configured to manage and execute control over microgrids that include electrically or geographically small electrical power systems operating in alternating current (AC), direct current (DC), or hybrid configurations, and ranging in scale from hundreds of watts to gigawatts;
wherein the microgrid controller is configured for field deployment to remote, constrained, or environmentally harsh locations and is further configured to operate autonomously and in isolation upon deployment; and
wherein the microgrid controller is pre-configured using a comprehensive design and test environment that enables validation of the control logic prior to removal from a development environment.

2. The system of claim 1, wherein the microgrid simulator is further configured to model, simulate, and visualize electrical networks of arbitrary size, topology, and complexity, including but not limited to networks exceeding the scale of conventional microgrids.

3. The system of claim 1, wherein the monitoring system is further configured to collect, aggregate, and timestamp measurements originating from both the electrical microgrid and the microgrid controller, including but not limited to voltage, current, power, frequency, state-of-charge, and control state variables, for visualization, diagnostics, and closed-loop analytics.

4. The system of claim 1, wherein the control system designer is further configured to generate cross-platform control logic assemblies deployable to the microgrid controller, and compatible with heterogeneous operating environments, including but not limited to Windows-based and Linux-based embedded systems, without requiring modification to core control logic.

5. The system of claim 1, wherein the control system designer comprises at least one of a graphical user interface and script-based development tools enabling programmatic specification, customization, and extension of specialized control logic behavior.

6. The system of claim 5, wherein the graphical user interface includes a library of modular, predefined control blocks that may be selected, arranged, and interconnected by a user to construct executable control flows governing microgrid operations.

7. The system of claim 1, wherein the data server of the microgrid controller is configured to receive, buffer, and expose structured telemetry and event data originating from the electrical microgrid through secure and standardized communication protocols.

8. The system of claim 7, wherein the data received from the electrical microgrid includes at least one of: bus voltages, frequency, generator output power, load consumption values, transformer tap positions, cable current magnitudes, and time-synchronized measurement data for use in closed-loop control and historical analysis.

9. The system of claim 1, wherein the control logic deployed to the microgrid controller is user-defined and configured to execute control functions that govern an operational state and performance of the electrical microgrid, and wherein such control functions are implemented using closed-loop control strategies that respond to real-time measurements and system feedback, rather than relying solely on open-loop command issuance, thereby enabling adaptive, dynamic, and autonomous regulation of microgrid behavior.

10. The system of claim 9, wherein the control functions include at least one of: detection and fault mitigation, dynamic topology reconfiguration, correction of steady-state deviation corrections, initiation of planned islanding mode, initiating of unplanned islanding, autonomous management of energy storage systems, real-time load-shedding, and renewable generation curtailment.

11. The system of claim 1, wherein the control logic is configured to execute deterministically, such that for a given input state, a resulting control outputs are repeatable and predictable, thereby ensuring system reliability in real-time control applications; and wherein such deterministic execution is designed with longevity in mind, enabling the control logic to operate continuously, year-round, without degradation or failure under normal and expected field conditions.

12. The system of claim 1, wherein the control logic is configured to execute periodically, based on a user-defined or system-defined execution frequency, to enforce deterministic control cycles and enable synchronization with external data or events, the period can range from milliseconds, to seconds, to minutes therefore alluding to a specialized control logic that can operate at multiple scan rates.

13. The system of claim 1, wherein the control logic is tuned, modified, and re-deployed to the microgrid controller without requiring shutdown, decommissioning, or removal of the microgrid controller from its operational environment.

14. The system of claim 1, wherein the control logic is configured to dynamically request services from the plurality of analysis, modeling, and re-configuration services, in order to inform or adapt its real-time control strategies based on updated system models, performance metrics, or operator-defined objectives.

15. The system of claim 1, wherein the microgrid controller, after deployment of the control logic, is configured to undergo staged validation and verification through integration and testing with at least one of:
   (i) the host machine,
   (ii) a real-time simulator, or
   (iii) a power-hardware-in-the-loop emulation environment,
   prior to connection with a target physical microgrid, thereby enabling progressive refinement of control performance before field deployment.

16. The system of claim 1, wherein the host machine includes simulation software configured to represent a plurality of microgrid operational modes, including at least:
   (i) islanded operation;
   (ii) grid-connected operation; and
   (iii) transitional states between islanded and grid-connected modes;
   wherein the simulation software is further configured to model microgrid behavior across multiple analysis domains, including:
   phasor-domain analysis,
   quasi-static time series analysis,
   electromagnetic transient simulation,
   short-circuit studies,
   electromechanical transient simulation,
   co-simulation of coupled subsystems, and
   unbalanced load flow studies.

17. The system of claim 1, wherein, upon successful completion of factory acceptance testing, the microgrid controller is operable as a standalone hardware enclosure for deployment in remote, unmanned, and environmentally harsh locations, without reliance on the host machine, and is configured to maintain continuous, autonomous, closed-loop control of the microgrid over extended operational durations.

18. The system of claim 1, wherein the microgrid controller is configured to communicate with third-party or customer-owned devices using standardized communication protocols, and wherein the deployed control logic includes embedded routines implementing one or more of:
   IEC 61850,
   Modbus, and
   DNP3,
   thereby ensuring interoperability with external systems and compliance with communication standards.

19. The system of claim 13, wherein the control logic is configured to be tuned and re-deployed to the microgrid controller during operation without requiring recompilation, decommissioning, or interruption of closed-loop execution, thereby enabling real-time updates via hot-swapping;
   and wherein the host machine is optionally transportable to a field-deployed microgrid controller to perform on-site hot-swapping.

20. The system of claim 1, wherein the host machine provides a self-contained design environment such that no external tools, components, or systems are required to design, program, or deploy the microgrid controller;
   wherein the system is configured to produce commercially viable microgrid controllers suitable for deployment in unmanned, remote, and environmentally harsh locations without further modification or auxiliary infrastructure;
   wherein the microgrid controller is configured to operate with alternating current (AC), direct current (DC), or hybrid microgrids across a range of power levels from watts to gigawatts; and
   wherein the deployed control logic is configured to support both planned and unplanned islanding events.

* * * * *